Nov. 10, 1931. G. F. CREMER 1,831,408
CREEPER
Filed Oct. 29, 1930

Inventor
G. F. Cremer

Patented Nov. 10, 1931

1,831,408

UNITED STATES PATENT OFFICE

GEORGE F. CREMER, OF MILWAUKEE, WISCONSIN

CREEPER

Application filed October 29, 1930. Serial No. 491,959.

This invention relates to what is known as a creeper.

One of the objects of the present invention is the provision of a creeper particularly adapted for use in supporting a person's body beneath a motor vehicle, or in any convenient position where it is desired to work on parts beneath an object, such as a motor vehicle and provision is included in the construction of the creeper to provide suitable traction means, whereby the creeper can be propelled while a person's body is at rest upon the same, so that the creeper can be quickly moved beneath the body of a vehicle or from beneath the same.

Another object of the present invention is the provision of a creeper provided at spaced supporting points with traction means, whereby when a person's body is resting upon the creeper at approximately the central portion thereof, the creeper can be easily propelled over a traction surface and additional means is provided for retaining the creeper against movement when placed in the desired location, so that while a person's body is resting upon the creeper in the desired position, the retaining means will prevent any movement of the creeper through the medium of the traction means.

A further object of the invention is the provision of a creeper wherein the construction is reduced to a minimum simplicity, providing two traction supporting points whereby the device can be readily moved about over a surface when equally balanced and also provides means whereby the device can be retained against movement when weight is applied to either side of the traction balance.

With the above and other objects in view, the invention consists in the novel features of construction, the combination and arrangement of parts hereinafter more fully set forth, pointed out in the claims and shown in the accompanying drawings wherein:

In the construction of creepers, which are particularly adapted for use in gaining access to the lowermost parts of motor vehicles for repair purposes, they are usually equipped with a four-point traction support, with no means for retaining the creepers against movement when stopped at a predetermined position, and it is, therefore, one of the principal objects of this invention to provide an improved type of creeper having a traction supporting point at each end thereof arranged parallel with the longitudinal center of the creeper, so that when a person's body rests thereon along the center line, the creeper can be easily propelled about, and means is provided whereby when the creeper is brought to rest at a predetermined point, a slight movement of the body at either side of the center will cause the retaining means to be brought into play to retain the creeper against movement.

In the construction of my improved creeper, I provide two substantially flat castings 1 and 1' arranged at each end of the creeper. The castings 1 and 1' are provided with enlarged portions 2 and 2' at their outer ends.

Figure 1:
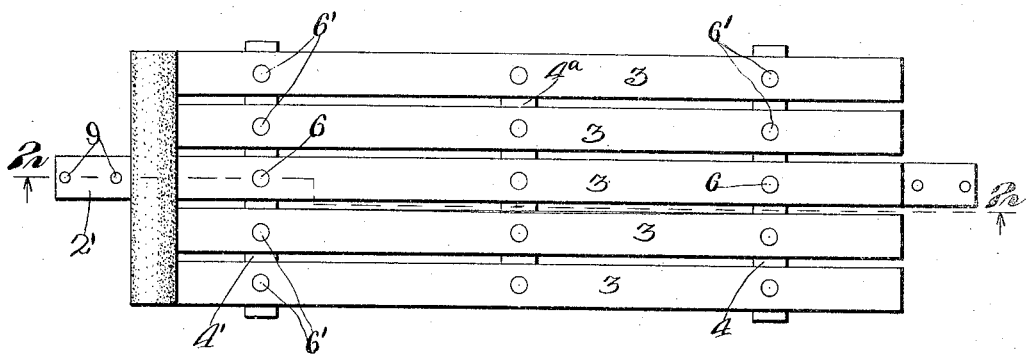
Figure 1 is a top plan view of a creeper constructed in accordance with my invention.

The body supporting platform of the creeper comprises a plurality of parallel arranged slats which are arranged in equal spaced relation as shown in Figure 1. The slats 3 may be used in any number and are connected adjacent their ends by means of cross straps 4 and 4'. It will be noted in Figure 2 that the inner ends of the castings 1 and 1' are provided with offset portions 5 and 5' of a width equal to the width of the straps 4 and 4' to receive and support these straps.

Figure 2:
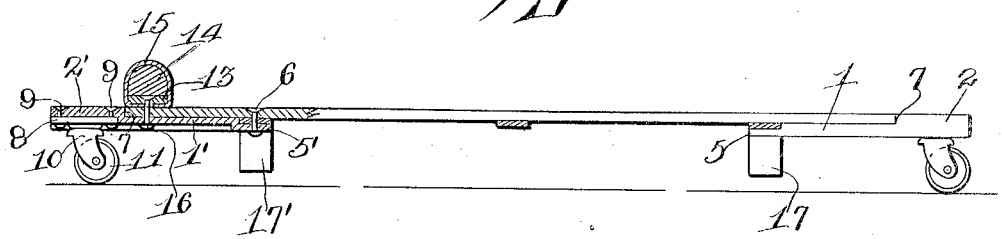
Figure 2 is a longitudinal sectional view on the line 2—2 of Figure 1.

The inner ends of the casting plates 1 and 1', the central slat and the cross straps 4 and 4' are suitably riveted together as shown at 6 in Figure 2, while the remaining slats are also riveted to the cross straps as shown at 6' in Figure 1.

The slats 3 are also connected along a transverse center line by means of an additional slat 4a, thus providing a platform which will support considerable weight. It will be noted that the central slat extends parallel with and has its ends resting upon the casting plates 1 and 1', while the extremities of this central slat abuts against the shoulders 7 and formed by the inner ends of the enlarged portions 2 and 2', thus retaining the platform against any longitudinal movement relative to the casting plates.

Secured to the lower faces of the enlarged portions 2 and 2', are the bearing plates 8 which are preferably set into the lower faces of the enlarged portions, as shown at the left in Figure 2. These bearing plates are connected to the enlarged portions by means of rivets 9.

Figure 3:
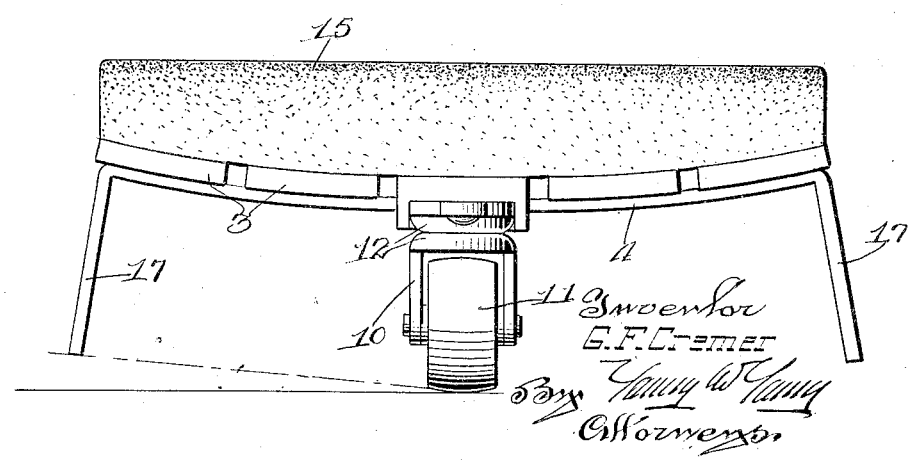
Figure 3 is an end elevation.

The trunnions 10 for the castors 11, support suitable ball bearing raceways 12, as shown in Figures 2 and 3, to provide for a free rotative movement of the said castors. Arranged transversely across the upper face of the slats 3, at one end thereof, is a head rest which includes a base slat 13 having a pad 14 resting thereon, while the base plate and pad are provided with a suitable covering 15. The head rest is connected to the slats of the platform, as well as the casting plates 1 and 1', by means of rivets 16.

Attention is directed to the fact that the cross straps 4 and 4' have their ends extending downwardly in a slightly divergent plane, as shown in Figure 3, to provide the retaining arms 17 and 17', the lower ends of which are normally disposed in spaced relation with the traction surface, as indicated at Figure 3. At this time, it might be well to call attention to the fact that the cross straps 4 and 4' are slightly curved, as shown in Figure 3, to provide a comparatively comfortable position for the body when resting upon the platform. In the use of this device, a person will lie down on the platform with their head resting upon the head rest at one end thereof, and when it is desired to propel the creeper about on the traction castors 11, the body should rest directly in the center of the platform, so that the retaining arms 17 and 17' will be arranged in spaced relation relative to the traction surface.

However, when the creeper has been moved to a predetermined position, the person using the same can then move their body to one side of the center, causing the creeper to tilt until the retaining arms at one side thereof will engage with the traction surface, thus retaining the creeper against further movement.

From the above, it will be apparent that I have provided a simple and inexpensive creeper, provided with a minimum number of supporting points to reduce the cost of manufacture and wherein the creeper can be quickly moved about when a person's body is resting thereon, but can be brought to a position to bring the retaining arms into play to prevent further movement of the creeper. This device is extremely useful when repairing parts of motor vehicles which are located underneath the body of the vehicle.

While I have shown and described the preferred embodiment of my invention, it will be apparent from the foregoing that slight changes may be made in the construction when putting the invention into practice without departing from the spirit of the same or the scope of the appended claim.

I claim:

A creeper comprising a platform including a central longitudinal slat and side longitudinal slats, a cross slat connecting the longitudinal slats together at their transverse center, centrally disposed supporting brackets projecting beyond the ends of the platform, said brackets each including a body portion engaging the lower face of the central longitudinal slat having an enlargement at one end forming a shoulder for engaging the end of the central slat and an offset at its inner end, cross straps arranged transversely of the platform between the offset ends of the brackets and the longitudinal slats, depending arms formed on the ends of the straps, and traction rollers carried by the enlarged ends of the brackets.

In testimony that I claim the foregoing I have hereunto set my hand at Milwaukee, in the county of Milwaukee and State of Wisconsin.

GEORGE F. CREMER.